US007353390B2

(12) United States Patent
Chandley et al.

(10) Patent No.: US 7,353,390 B2
(45) Date of Patent: Apr. 1, 2008

(54) ENABLING NETWORK DEVICES WITHIN A VIRTUAL NETWORK TO COMMUNICATE WHILE THE NETWORKS'S COMMUNICATIONS ARE RESTRICTED DUE TO SECURITY THREATS

(75) Inventors: Adrian M. Chandley, Sammamish, WA (US); Thomas G. Phillips, Bellevue, WA (US); William J. Westerinen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 10/923,349

(22) Filed: Aug. 20, 2004

(65) Prior Publication Data

US 2006/0041937 A1 Feb. 23, 2006

(51) Int. Cl.
*G06F 1/24* (2006.01)
(52) U.S. Cl. ...................... 713/168; 713/182
(58) Field of Classification Search .............. 713/168, 713/182
See application file for complete search history.

(56) References Cited

U.S. PATENT DOCUMENTS

2002/0095593 A1 7/2002 Daniell et al.

FOREIGN PATENT DOCUMENTS

| WO | WO 01/91418 A2 | 11/2001 |
| WO | WO 2004/034672 A1 | 4/2004 |
| WO | WO 2004/057834 A2 | 7/2004 |

OTHER PUBLICATIONS

Hunt, R., "Internet/Intranet Firewall Security—Policy, Architecture and Transaction Services," *Computer Communications* 21(13):1107-1123, Sep. 1998.

*Primary Examiner*—Thomas R. Peeso
(74) *Attorney, Agent, or Firm*—Christensen O'Connor Johnson Kindness PLLC (57) ABSTRACT

A system and method for enabling a network device to resume network activities in a secure manner on a communication network when network activities are generally blocked by protective security measures implemented by network security modules is presented. During its periodic update request, a network security module blocking the network activities of the network device requests updated security measures from an administrator-configurable security service. The security service determines whether the network security module/network device may receive a relaxed set of security measures that, when implemented by the network security module, enable the network device to resume some network activities. If the security service determines that the network security module/network device may receive a relaxed set of security measures, the relaxed set of security measures are returned to and implemented on the network security module, thereby enabling the network device to resume some network activities.

24 Claims, 8 Drawing Sheets

ENABLING NETWORK DEVICES WITHIN A VIRTUAL NETWORK TO COMMUNICATE WHILE THE NETWORKS'S COMMUNICATIONS ARE RESTRICTED DUE TO SECURITY THREATS

FIELD OF THE INVENTION

The present invention relates to a computer network and device security, and more particularly, to a system and method for securely enabling networked devices within a virtual network to operate while the network's communications are generally restricted due to security threats.

BACKGROUND OF THE INVENTION

As more and more computers, and other computing devices, are inter-connected through various networks, such as the Internet, computer security has become increasingly more important, particularly from invasions or attacks delivered over a network or over an information stream. As those skilled in the art will recognize, these attacks come in many different forms, including, but certainly not limited to, computer viruses, computer worms, system component replacements, denial of service attacks, even misuse/abuse of legitimate computer system features, all of which exploit one or more computer system vulnerabilities for illegitimate purposes. While those skilled in the art will realize that the various computer attacks are technically distinct from one another, for purposes of the present invention and for simplicity in description, all of these attacks will be generally referred to hereafter as computer exploits, or more simply, exploits.

When a computer system is attacked or "infected" by a computer exploit, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer exploits is that an infected computer system is used to infect other computers.

Figure 1:
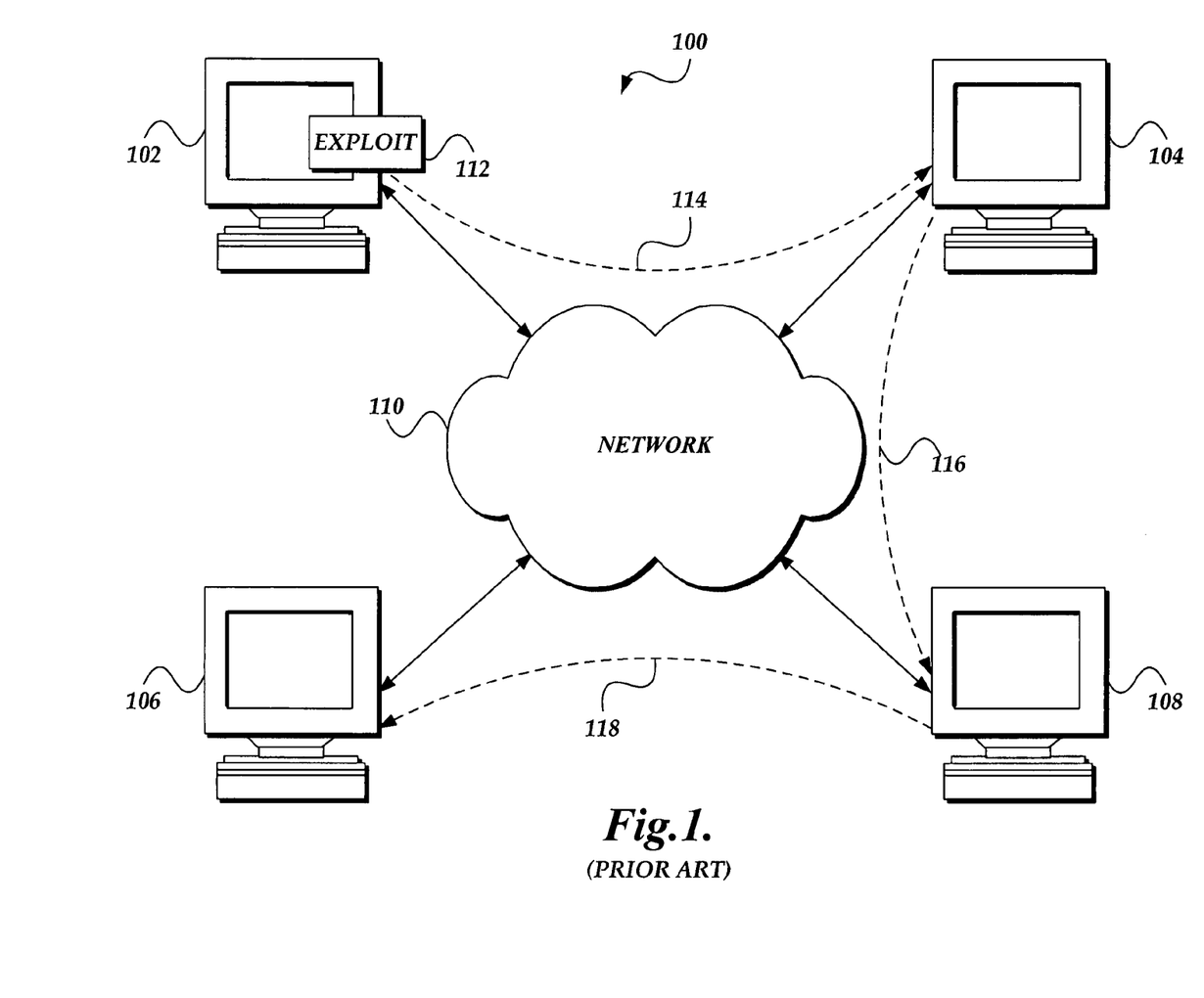
FIG. 1 is a pictorial diagram illustrating an exemplary networked environment, as found in the prior art, over which a computer exploit is commonly distributed.

FIG. 1 is a pictorial diagram illustrating an exemplary networked environment 100 over which a computer exploit is commonly distributed. As shown in FIG. 1, the typical exemplary networked environment 100 includes a plurality of computers 102-108 all inter-connected via a communication network 110, such as an intranet or via a larger communication network including the global TCP/IP network commonly referred to as the Internet. For whatever reason, a malicious party on a computer connected to the network 110, such as computer 102, develops a computer exploit 112 and releases it on the network. The released computer exploit 112 is received by, and infects, one or more computers, such as computer 104, as indicated by arrow 114. As is typical with many computer exploits, once infected, computer 104 is used to infect other computers, such as computer 106 as indicated by arrow 116, which in turn infects yet other computers, such as computer 108 as indicated by arrow 118. Clearly, due to the speed and reach of the modern computer networks, a computer exploit 112 can "grow" at an exponential rate, and quickly become a local epidemic that quickly escalates into a global computer pandemic.

A traditional defense against computer exploits, and particularly computer viruses and worms, is anti-virus software. Generally, anti-virus software scans incoming data, arriving over a network, looking for identifiable patterns associated with known computer exploits. Upon detecting a pattern associated with a known computer exploit, the anti-virus software may respond by removing the computer virus from the infected data, quarantining the data, or deleting the "infected" incoming data. Unfortunately, anti-virus software typically works with "known," identifiable computer exploits. Frequently, this is done by matching patterns within the data to what is referred to as a "signature" of the exploit. One of the core deficiencies in this exploit detection model is that an unknown computer exploit may propagate unchecked in a network until a computer's anti-virus software is updated to identify and respond to the new computer exploit.

As anti-virus software has become more sophisticated and efficient at recognizing thousands of known computer exploits, so too have computer exploits become more sophisticated. For example, many recent computer exploits are now polymorphic, or in other words, have no identifiable pattern or "signature" by which they can be recognized by anti-virus software in transit. These polymorphic exploits are frequently unrecognizable by anti-virus software because they modify themselves before propagating to another computer system.

Another defense that is common today in protecting against computer exploits is a hardware or software network firewall. As those skilled in the art will recognize, a firewall is a security system that protects an internal network from unauthorized access originating from external networks by controlling the flow of information between the internal network and the external networks. All communications originating outside of the firewall are first sent to a proxy that examines the communication, and determines whether it is safe or permissible to forward the communication to the intended target. Unfortunately, properly configuring a firewall so that permissible network activities are uninhibited and that impermissible network activities are denied is a sophisticated and complicated task. In addition to being technically complex, a firewall configuration is difficult to manage. When firewalls are improperly configured, permissible network traffic may be inadvertently shut down and impermissible network traffic may be allowed through, compromising the internal network. For this reason, changes to firewalls are generally made infrequently, and only by those well versed in the subject of technical network design.

As yet a further limitation of firewalls, while a firewall protects an internal network, it does not provide any protection for specific computers. In other words, a firewall does not adapt itself to a specific computer's needs. Instead, even if a firewall is used to protect a single computer, it still protects that computer according to the firewall's configuration, not according to the single computer's configuration.

Yet another issue related to firewalls is that they do not provide protection from computer exploits originating within the borders established by a firewall. In other words, once an exploit is able to penetrate the network protected by a firewall, the exploit is uninhibited by the firewall. This situation frequently arises when an employee takes a portable computer home (i.e., outside of the corporate firewall protection) and uses it at home in a less secured environment. Unknown to the employee, the portable computer is then infected. When the portable computer is reconnected to the corporate network within the protection of the firewall, the exploit is often free to infect other computers unchecked by the firewall. Similarly, when a person, unknowingly or otherwise, brings in media infected with a computer exploit, such as on a CD-ROM, a floppy disk, a flash memory storage device, or the like, and reads or executes information stored on the media using a computer within the protective borders of the firewall, that computer and the corporate network is again exposed and at risk, unprotected by the firewall.

With regard to the problem of connecting, or reconnecting, a portable computer potentially infected by a computer exploit to a network, one solution has been to place the added computer in a quarantined virtual local area network (referred to as VLAN) within the network. VLANs, as are known in the art, are logical sub-networks that may be established within an actual network irrespective of the actual, physical configuration of the network. A network administrator controls the ability of computers within one VLAN to communicate with other devices outside of the VLAN in the network, such as with computers and devices in other VLANs. Thus, the quarantined VLAN is configured to disallow computers within the quarantined VLAN to communicate with any other devices and/or computers outside of the quarantined VLAN, with very limited exceptions. Only after the added computer is certified as being free of computer exploits is the added computer admitted to other "regular" VLANs in the network. Unfortunately, while this practice may protect the network from any computer exploits found on the added computer, there are potentially serious consequences.

One consequence of quarantining an added computer to a quarantined VLAN is that the added computer is exposed to any computer exploit circulating within the quarantined VLAN. Thus, while the added computer may be free of all computer exploits prior to being quarantined, when placed in the quarantined VLAN there is a substantial risk that it will be infected by computer exploits on other computers also quarantined to the quarantined VLAN. As another consequence, if the added computer is infected with a computer exploit, when the added computer is placed in the quarantined VLAN the other computers within the quarantine are exposed to the computer exploits infecting the added computer. In short, while the network as a whole may be protected, the likelihood of a computer placed in the quarantined VLAN being infected by a computer exploit is substantially increased.

As mentioned above, computer exploits now leverage legitimate computer system features in an attack. Thus, many parties other than firewall and anti-virus software providers must now join in defending computers from these computer exploits. For example, operating system providers must now, for economic and contractual reasons, continually analyze their operating systems to identify weaknesses or vulnerabilities that may be used by a computer exploit. For purposes of the present discussion, any avenue by which a computer exploit may attack a computer system will be generally referred to as a computer system vulnerability, or simply a vulnerability.

As vulnerabilities are identified and addressed in an operating system, or in other computer system components, drivers, and/or applications, a provider will typically release a software update to remedy and address the vulnerability. These updates, frequently referred to as patches, are intended to be installed on a computer system in order to secure the computer system from the identified vulnerabilities. However, these updates are, in essence, code changes to components of the operating system, device drivers, or software applications, etc. As such, they cannot be released as rapidly and freely as anti-virus updates from anti-virus software providers. Because these updates are code changes, the software updates require substantial in-house testing prior to being released to the public. Unfortunately, even with in-house testing, a software update may cause one or more other computer system features to break or malfunction. Thus, software updates create a huge dilemma to parties that rely upon certain aspects of a computer system, especially if it may affect critical features of the computer system. More specifically, does a party update its computer systems to protect them from the vulnerability and risk disrupting their computer systems' operations, or does the party refrain from updating its computer systems and run the risk that its computer systems may be infected?

One novel approach to protecting network devices, including personal computers, personal digital assistants (PDAs), mobile communication devices, and the like, is to place a network security module between the network and the network device such that all communication to and from the network device must pass through the network security module. This novel approach is described in greater detail in commonly assigned, U.S. Provisional Patent Application No. 60/544,783, filed Feb. 13, 2004, entitled "System and Method for Securing a Computer System Connected to a Network from Attacks," and is incorporated in its entirety herein by reference.

According to this incorporated system and method, each network security module implements, or enforces, security measures corresponding to the protected network device's specific configuration and also to currently identified computer system vulnerabilities. The network security modules obtain the security measures from a security service, either from a global security service or through a hierarchical organization of security services, called federated security services. Implementing or enforcing security measures implies exercising control over various aspects of network activities to and from the protected network device. Examples of the security measures include: blocking all network communications to and from a protected network device except communications between the protected network device and trusted network locations, such as security services or anti-virus software services; blocking network traffic on certain communication ports and addresses; blocking communications to and/or from certain network-related applications, such as an e-mail or Web browser application; and blocking access to particular hardware or software components on the protected network device.

In operation, a network security module is typically configured to periodically query or poll a security service for the current security measures. Thus, when a computer exploit is detected on the network, or if an operating system provider detects a vulnerability in its system, the operating system provider provides security measures to counter the vulnerability/exploit to the security services. These updated security measures are then obtained by the network security modules as they periodically poll the security service. Once obtained, the updated/current security measures are implemented/enforced by the network security module, thereby insulating the protected network device from the detected computer exploit or vulnerability.

Until a computer exploit is better understood, initial security measures may include blocking all network activities to and from the protected network device. However, once the computer exploit is better understood, a less stringent set of security measures may be used to permit some network activity, yet maintain adequate protection from the vulnerability. Further on, once a software update or an anti-virus update has been developed and subsequently installed on the protected network device, a new set of security measures may be obtained permitting "normal"

network activity to resume, this new set reflecting the fact that the protected network device is no longer vulnerable due to the installation of the software or anti-virus update.

While the above-incorporated system addresses how to protect network devices from computer exploits, a real possibility exists that when a particularly virulent computer exploit is detected, all network activities on all network devices within a network will be blocked, including communications between computers carrying out business-critical operations. For example, assume a business-critical application runs on an application server, and relies upon obtaining information stored on a database server elsewhere in the computer network. Blocking all network activities would necessarily mean that the application server would not be able to obtain information from the database server, thereby bringing the business-critical application to a halt.

One solution, described in greater detail in commonly assigned, U.S. Provisional Patent Application No. 60/544,772, filed Feb. 13, 2004, entitled "System and Method for Protecting a Computing Device From Computer Exploits Delivered Over a Networked Environment in a Secured Communication," is to use an override to a network security module, thereby bypassing the security measures designed to protect the network device. However, in many situations, including most business environments, it is not desirable for a network security module to include an override. Most system administrators would prefer to determine which, if any, computers should be able to override protective security measures.

In light of the above-described problems, what is needed is a system and method for enabling specific network devices within a VLAN to communicate while communication activity over the network is restricted due to security threats. These, and other issues found in the prior art, are addressed by the present invention.

SUMMARY OF THE INVENTION

In accordance with the present invention, a system for enabling a first network device to resume network activities in a secure manner on a communication network when network activities are generally blocked by protective security measures implemented by network security modules is provided. The system includes a communication network and a plurality of network security modules including a first network security module. Each of the plurality of network security modules is interposed between the communication network and a network device, and in particular, the first network security module is interposed between the communication network and the first network device. Further, each of the plurality of network security modules controls network activities to and from the protected network device by implementing security measures obtained from a security service. The system also includes a security service that provides security measures to at least the first network security module. The security service is configurable by an administrator such that when the plurality of network security modules are implementing security measures that block network activities to and from the plurality of network device, the security service provides a relaxed set of security measures to the first network security module. When the relaxed set of security measures are implemented by the first network security module, the first network device can resume at least some network activities.

In accordance with additional aspects of the present invention, a method is presented, implemented on security service in a communication network, for enabling a first network device to resume network activities in a secure manner on the communication network when the network activities on the communication network are blocked by protective security measures implemented by network security modules. A request for security measures is received from a network security module. The network security module is interposed between the communication network and the first network device. A determination is made as to whether the security service has been configured to deliver a relaxed set of security measures to the network security module. This relaxed set of security measures, when implemented by the network security module, will enable the first network device to resume network activities in a secure manner on the communication network. The relaxed set of security measures are returned to the network security module if it is determined that the security service has been configured to deliver the relaxed set of security measures to the network security module.

In accordance with yet further aspects of the present invention, a computer-readable medium bearing computer-executable instructions is presented. The computer-executable instructions, when executed on computing device that provides security measures to a plurality of network security modules interposed between a communication network and network devices, carry out a method for enabling a first network device to resume network activities in a secure manner on the communication network when network activities on the communication network are generally blocked by protective security measures implemented by network security modules. The method comprises first receiving a request for security measures from a network security module interposed between the communication network and the first network device. A determination is then made as to whether the security service has been configured to deliver a relaxed set of security measures to the network security module. This relaxed set of security measures, when implemented by the network security module, will enable the first network device to resume network activities in a secure manner on the communication network. Thereafter, returning the relaxed set of security measures to the network security module if it is determined that the security service has been configured to deliver the relaxed set of security measures to the network security module.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 2:
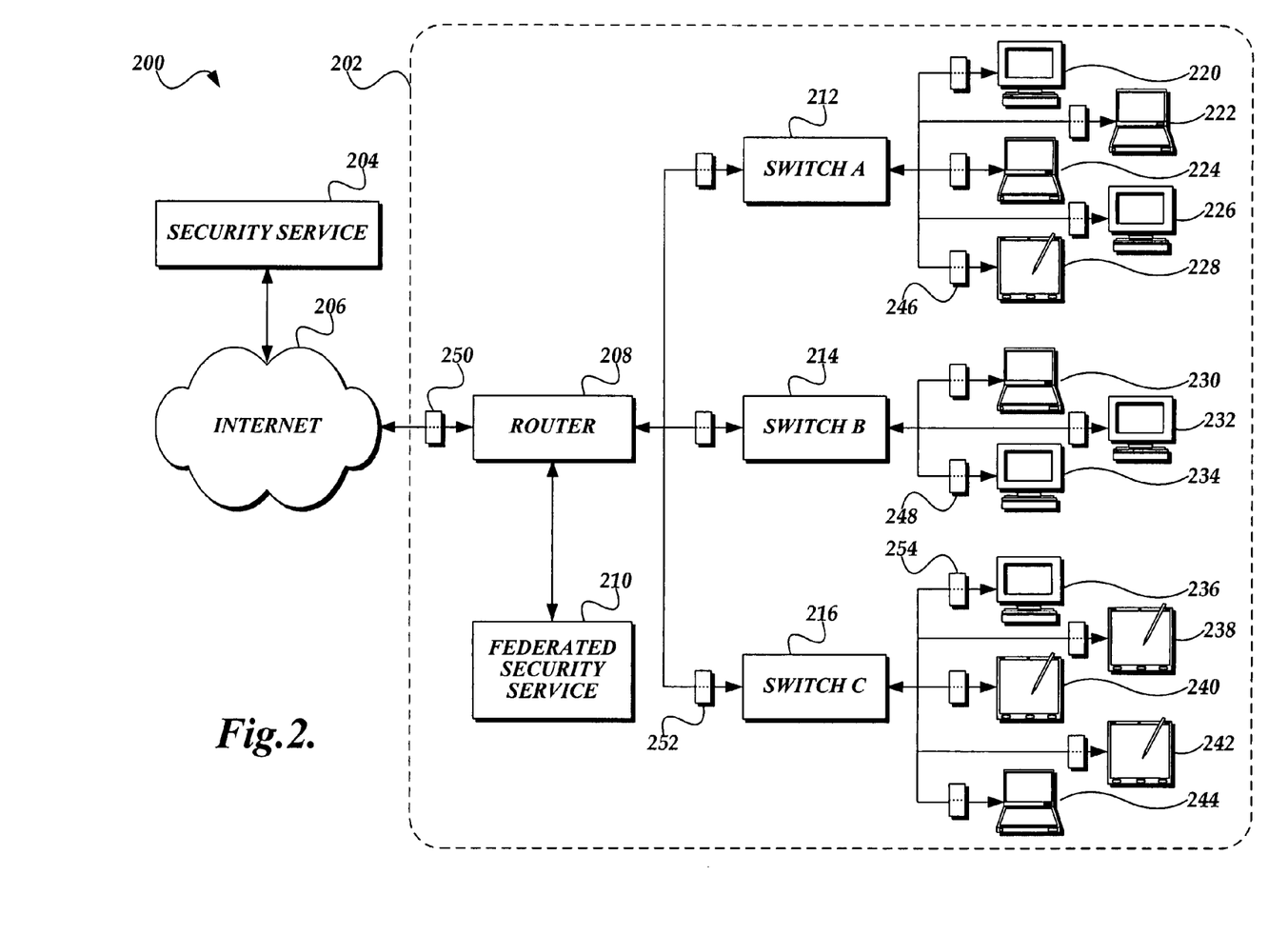
FIG. 2 is a pictorial diagram illustrating an exemplary physical networked environment suitable for implementing aspects of the present invention.

As mentioned above, the present invention is directed to enabling specific network devices within a VLAN to communicate while communication activity over the network is generally restricted due to security measures implemented by network security modules in response to detected vulnerabilities. FIG. 2 is a pictorial diagram illustrating an exemplary networked environment 200 suitable for implementing aspects of the present invention. The exemplary networked environment 200 a general security service 204 and a physical network 202, adapted according to aspects of the present invention, both connected to the Internet 206.

As illustrated in FIG. 2, the exemplary physical network 202 includes a router 208 and a federated security service 210. Also included in exemplary physical network 202 are network switches 212-216 and network computing devices 220-234. As can be seen in FIG. 2, network devices in the physical network 202 are protected by a network security module, including network security modules 246-252. For example, router 208 is protected by network security module 250, tablet computer 228 is protected by network security module 246, and switch C 216 is protected by network security module 252. However, it should be appreciated that the present invention may be implemented in a physical network where only network computing devices, such as network computing devices 220-234, are protected by network security modules.

While the exemplary physical network 202 is illustrated as including certain network hardware devices, in particular, router 208 and switches 212-216, it should be appreciated that the exemplary physical network is for illustration purposes only and should not be construed as limiting upon the present invention. Those skilled in the art will appreciate a physical network may include any number of network-related hardware devices organized in numerous configurations, all of which are contemplated as falling within the scope of the present invention.

As indicated above, the federated security service 210 operates as a distribution point for security measures from the security service 204. Clearly, a general/global security service, such as security service 204, that provides security measures to numerous networks and individual computing devices, cannot be practically administered and configured with specific information relating to the networks and devices it services. However, when a federated security service, such as federated security service 210, is established within a physical network, such as physical network 202, specifically for servicing the network security modules within the network, it is both practical and beneficial to administer and to configure the federated security service to the network and its network devices according to specific network concerns, needs, and circumstances. One such application of local administration arises when network activity on the physical network 202 is generally blocked by the network security modules due to a detected vulnerability thereby bringing a halt to critical operations. As will be described in greater detail below, the federated security service 210 may be administratively configured to supply a relaxed set of security measures to specific network devices when certain criteria are met, such that the specific network devices may resume network activities. Furthermore, the federated security service 210 may also be configured to cooperate with router 208, or some other network-related device within the physical network 202, to securely connect (or reconnect) a computer to the physical network, and in particular, to a VLAN within the network.

Figure 3:
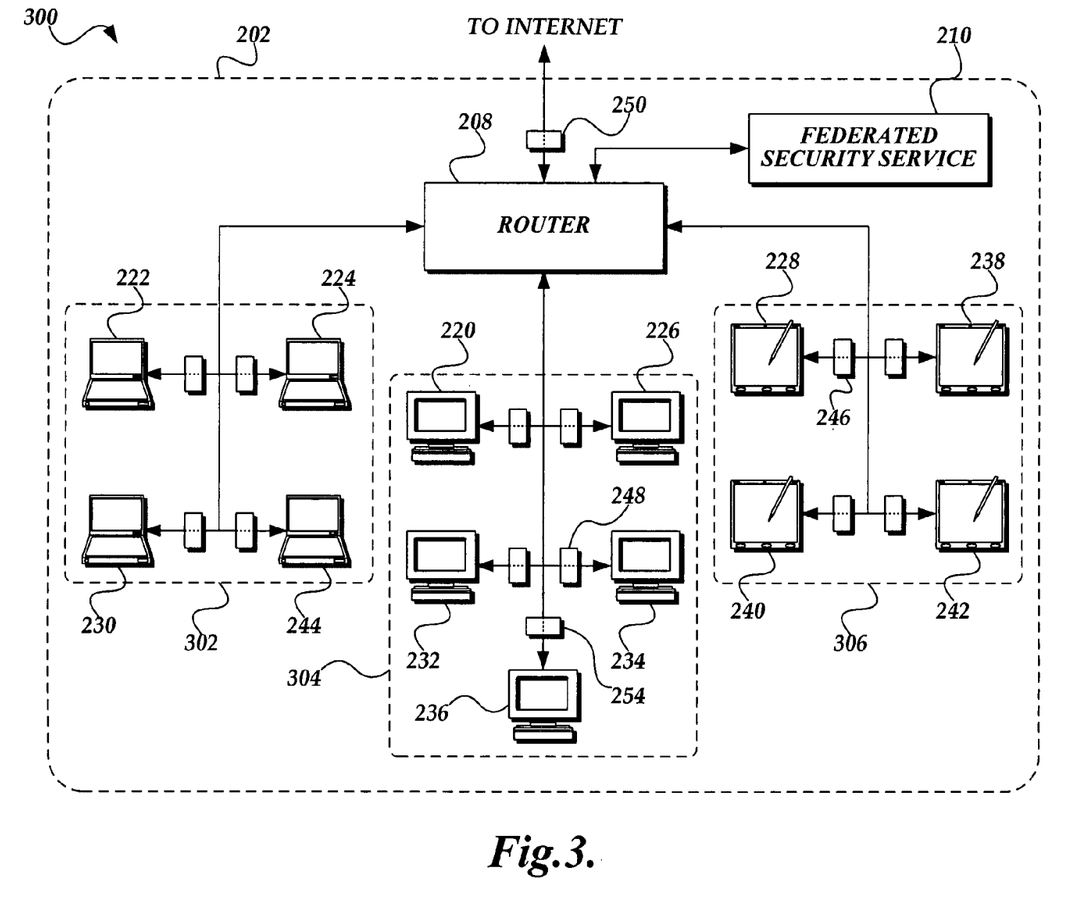
FIG. 3 is a pictorial diagram illustrating the exemplary physical networked environment of FIG. 2 organized into logical VLANs and suitable for implementing aspects of the present invention.

As mentioned above, a physical network 202 can be organized into any number of logical subnetworks, i.e., VLANs, irrespective of the actual physical arrangement of the network and its devices. For illustration purposes only, FIG. 2 includes three types of network computing devices in the physical network 202: workstations, including workstations 220, 226, 232, 234, and 236; notebook computers, including notebook computers 222, 224, 230, and 244; and tablet computers, including tablet computers 228, 238, 240, and 242. Because a physical network 202 may be virtually configured into logical configuration, if a network administrator were so inclined, VLANs could be created for each type of computing device, where each VLAN contained only one type of computing device. FIG. 3 is a pictorial diagram illustrating the exemplary physical network 202 of FIG. 2 organized into VLANs according to computing device type, and suitable for implementing and illustrating aspects of the present invention.

FIG. 3 illustrates the three VLANs described above, in particular, the notebook VLAN 302, the workstation VLAN 304, and the tablet computer VLAN 306. Those skilled in the art will appreciate that network devices within a VLAN may typically communicate with the other network devices within the VLAN. Those skilled in the art will also recognize that communications between network devices in disparate VLANs may also occur. However, for purposes of the present discussion, it is assumed that the VLANs have been configured such that network devices communicate only with other network devices within a particular VLAN. In addition to communication between computing devices, the network 202 is configured to permit network devices, or the network security modules, to communicate with the federated security service 210, or with the security service 204 (FIG. 2).

In one embodiment, the present invention operates to enable specific network devices to resume network activities while network activities are generally blocked by network security modules implementing security measures in response to a detected vulnerability. For example, a particularly virulent computer exploit may be detected circulating on the Internet 206, and an operating system provider initially determines that the exploit poses a significant threat to all computing devices running its operating system, including those computing devices within the physical network 202. As such, the operating system provider, via the security service 204, posts initial security measures that, in effect, direct network security modules to block all network activities to and from a protected network device. These initial security measures are distributed to any federated security services as well, including federated security service 210 that resides within the physical network 202. Thus, as the network security modules in the physical network 202, including network security modules 246-254, poll the federated security service 210 and obtain the initial security measures, network activities in the physical network 202, including network activities among network devices inside a VLAN, are blocked.

Continuing with the above example, it is assumed that the physical network 202 is a business's network, and that workstation 234 in the workstation VLAN 304 is an application server running business-critical applications which rely on information running on a database server located on workstation 236. Clearly, when network activities are blocked by network security modules 248 and 254 due to the threat posed by detected computer exploit, the business-critical applications are halted. Obviously, the business whose business-critical operations are now halted will clearly want to resume at least those operations and be secured from the threat posed by the detected computer exploit.

Continuing still with the above example, if the entire physical network 202 is not infected with the detected computer exploit before the security measures were implemented, the entire network is protected by the network security module 250 protecting the router 208. This would mean that network activities among network devices within the physical network 202 could resume without fear of infection from the detected computer exploit. Clearly, a general security service that supplies security measures to numerous networks, computers, and devices, such as security service 204 (FIG. 2), could not practically maintain specific, particular network configurations as well as evaluate those configurations to determine which devices could be permitted to resume network activities and with whom. However, when a network includes its own federated security service, such as federated security service 210, network-specific information regarding the network devices and network configuration may be stored and administered at that federated security service, to the effect that determinations can be made as to whether specific devices can be permitted to resume network activities while maintaining network security.

According to aspects of the present invention, an administrator may configure the federated security service 210 to provide a relaxed set of security measures for specific network security modules protecting network devices. This relaxed set of security measures would permit the protected network devices, such as workstations 234 and 236, or all devices within the workstation VLAN 304, to resume network activities with other enabled network devices. Thereafter, as each network security module, such as network security modules 248 and 254, periodically polled the federated security service 210 for the latest/current security measures, the federated security service could identify the source of the update request and return a set of security measures corresponding to the protected network device.

As described in the above-incorporated reference, as network security modules poll a security service 204 (FIG. 2) or a federated security service 210 to obtain updated security measures, a set of security measures is returned without any additional exchange of information. However, according to aspects of the present invention, where a federated security service 210 lies within the boundaries of a network 202 for the network's purpose, the federated security service may be configured to query a network security module/protected network device for additional configuration information before returning a set of security measures to the network security module. Based on the additional configuration information, or lack of additional configuration information, the federated security service 210 determines a set of security measures to return to the network security module. This additional information may include, but is not limited to, whether a particular software or anti-virus update has been installed on the protected network device, whether the network device is located within a particular VLAN, whether a test application executed by or on the network device confirms that the network device is free from computer exploits, and the like. Obtaining this additional information regarding a network device is illustrated below in regard to FIGS. 4A and 4B.

Figure 4A:
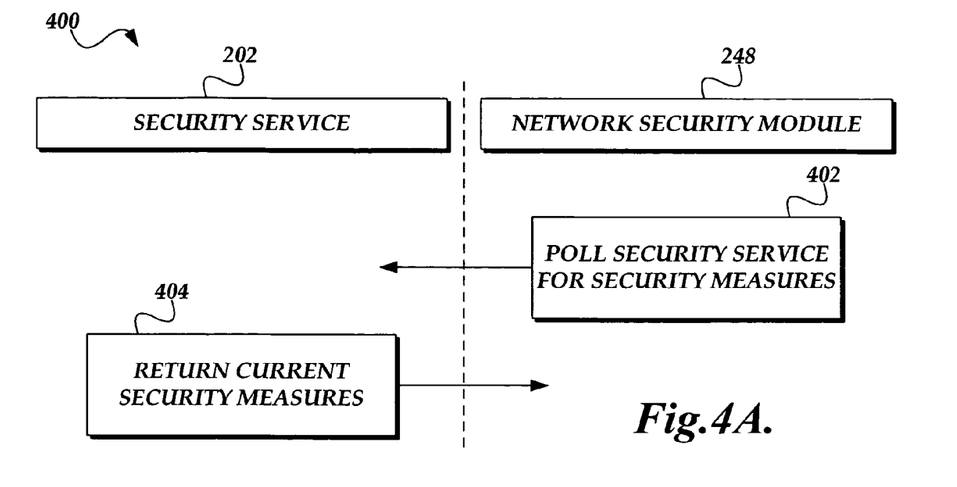
FIG. 4A illustrates an exemplary exchange between a network security module protecting a networked device and a security service for obtaining security measures to protect the networked device.

FIG. 4A illustrates an exemplary exchange between a network security module protecting a network device and a security service 204, or federated security service 210, for obtaining security measures to protect the network device from detected vulnerabilities. In particular, this exemplary exchange illustrates the typical manner in which a network security module obtains protective security measures, as described in the above-incorporated reference. The exchange between the two is described in terms of events. As shown in FIG. 4A, as indicated by event 402, a network security module, such as network security module 248, as part of its periodic update process, polls a security service 204, or federated security service 210, for updated/current security measures. In response, as indicated by event 404, the security service 204 returns the current security measures to the network security module. After obtaining the updated/current security measures, the network security module implements them, thereby protecting the network device.

Figure 4B:
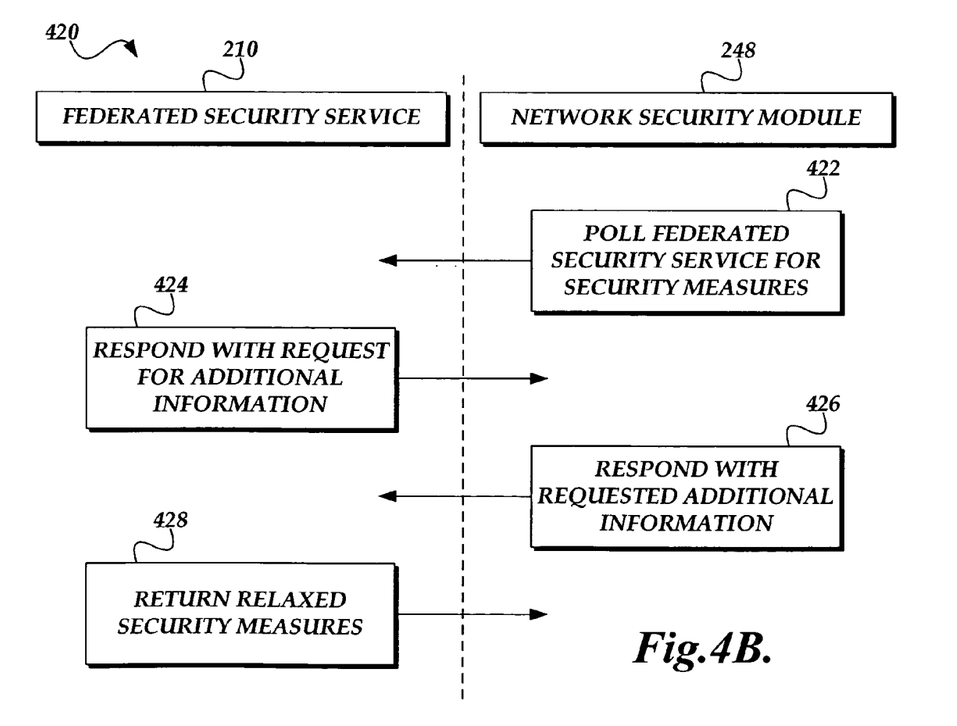
FIG. 4B illustrates an exemplary exchange between a network security module protecting a networked device in a protected VLAN and a federated security service for obtaining security measures to enable the protected networked device to communicate with other networked devices in the protected VLAN.

Unfortunately, as described above, under certain conditions, the typical exchange between a security service 204 and network security modules can effectively bring critical computer activities, particularly those that rely upon network communications, to a halt. Thus, in contrast to the exemplary exchange 400 described in FIG. 4A, FIG. 4B illustrates an exemplary exchange 420 between a network security module 248 protecting a network device and a federated security service 210 for obtaining security measures to protect the network device from detected vulnerabilities. In its periodic update process, as indicated by event 422, the network security module 248 polls the federated security service 210 for updated/current security measures to protect the network device. In this case, the federated security service 210 has been configured by an administrator to supply a relaxed set of security measures to this particular network security module 248 such that the protected network device may communicate over the network. In particular, in this exemplary exchange, the federated security service 210 has been configured to request additional information from the network security module 248.

Thus, in response to the request, as indicated by event 424, the federated security service 210 requests additional information from the network security module 248. As mentioned above, this additional information may include, but is not limited to, whether the protected device is free of computer exploits, whether the protected device has a particular software update or anti-virus update installed, whether the protected device lies within a particular VLAN, and the like. The network security module 248 may already be in possession of this additional information, or alternatively, may need to obtain the information from the protected network device.

Once the network security module 248 has the additional information, it is submitted to the federated security service 210, as indicated by event 426. After receiving the additional information, and assuming the substance of the additional information satisfies criteria established by the administrator for providing a relaxed set of security measures, the federated security service 210 returns a relaxed set of security measures to the network security module 248, as indicated by event 428. This relaxed set of security measures directs the network security module to allow the protected network device to resume certain communication/network activities, such as opening up unaffected TCP ports and the like. Of course, the federated security service may determine that the additional information fails to satisfy the criteria established by the administrator for providing a relaxed set of security measures, in which case, the "typical" security measures are returned to the network security device 248, and communications to and from the protected network device remain blocked.

Figure 5:
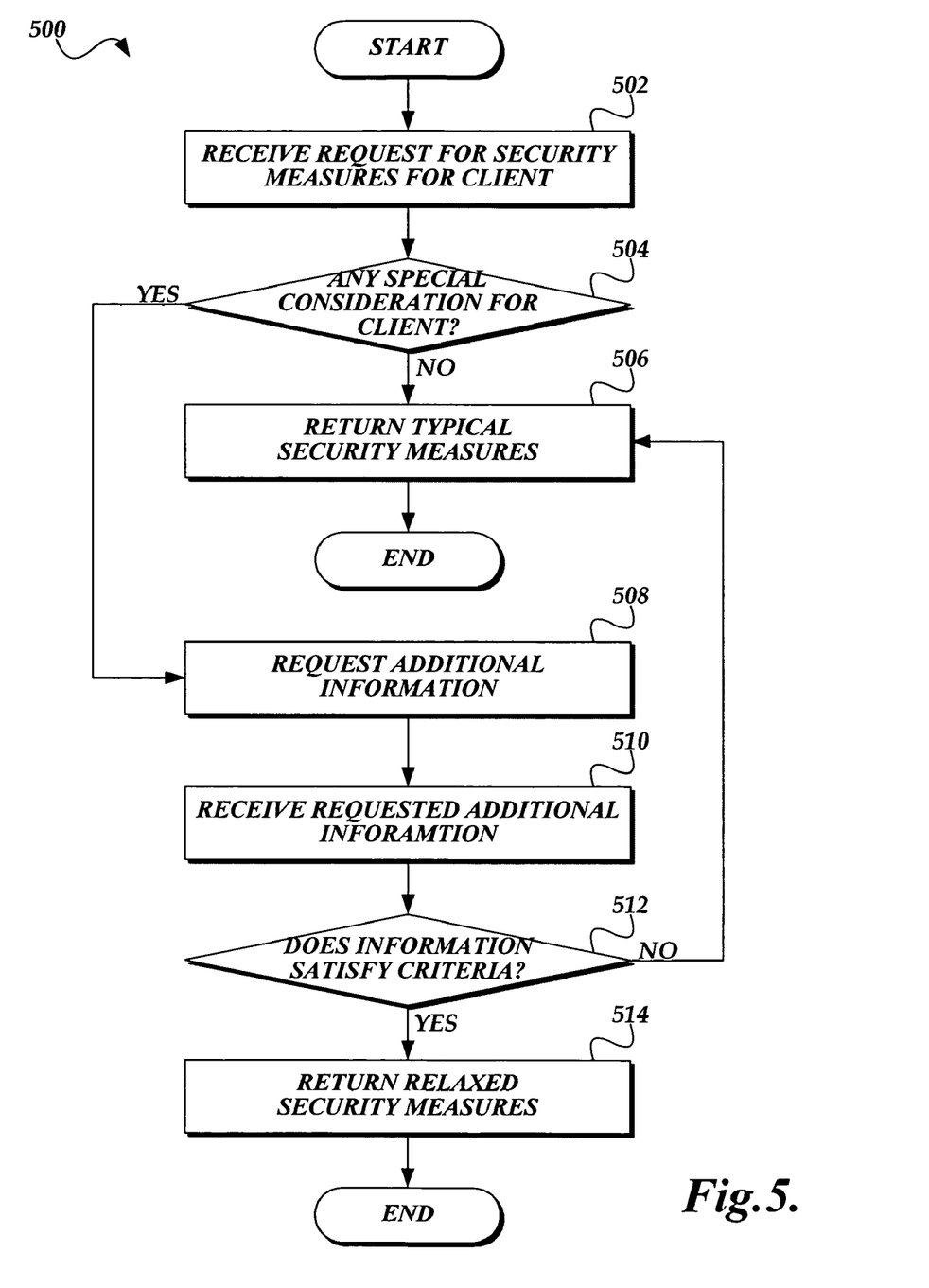
FIG. 5 is a flow diagram illustrating an exemplary routine executed on a federated security service for enabling a network device in a protected VLAN to communicate with other enabled network devices.

FIG. 5 is a flow diagram illustrating an exemplary routine 500, executed on a federated security service 210, for enabling a network device protected by a network security module to resume certain network activities when network activities are generally blocked due to a detected vulnerability. Beginning at block 502, the federated security service 210 receives a request from a network security module associated with a network device for updated security measures.

At decision block 504, a determination is made as to whether special consideration should be given to this particular network device. These special considerations are established by an administrator when configuring the federated security service 210 according to specific needs. These special considerations may include instructions for determining if the network security module protecting the network device can obtain alternative security measures other than the general security measures for the network, including the relaxed set of security measures described above. Typically, special considerations are established for specific network devices and corresponding network security modules, or for network devices and corresponding network security modules residing within a particular VLAN. Thus, if the network device/network security module is not identified as one which receives special consideration, at block 506, the federated security service 210 responds with the typical security measures generally applicable to network, and then terminates.

If the network device/network security module is identifiable as one to which special consideration is given, at block 508, the federated security service 210 responds with a request for additional information. As described above, this additional information may include whether a particular software update is installed, whether the current anti-virus software revision is installed, whether the network device is proven to be computer exploit-free, and the like. While this exemplary routine 500 illustrates that the federated security service 210 always requests the additional information, in an alternative embodiment, a test could be first made as to whether to obtain any additional information, or simply supply the alternative/relaxed set of security measures as per an administrator's configuration.

At block 510, the federated security service 210 receives the requested additional information. At decision block 512, another determination is made, this one as to whether the additional information satisfies the criteria established by the administrator for providing alternative security measures, such as a relaxed set of security measures, to the network security module. If the additional information fails to satisfy the criteria for providing the relaxed set of security measures, at block 506, the federated security service 210 returns the typical security measures for the general network, and then terminates. However, if the additional information satisfies the established criteria, at block 514, the federated security service 210 returns a relaxed set of security measures to the network security module. This relaxed set of security measures, when implemented by the network security module, will permit the protected network device to resume some network activities, such as communicating with other similarly enabled network devices. Thereafter, the exemplary routine 500 terminates.

While the exemplary routine 500 includes receiving a request from a network security module, in an alternative embodiment, the request from a network security module is received/handled outside of the routine, and initiates the remainder of routine 500. Accordingly, the exemplary routine 500 should be viewed as illustrative, and not be construed as limiting upon the present invention.

Figure 6:
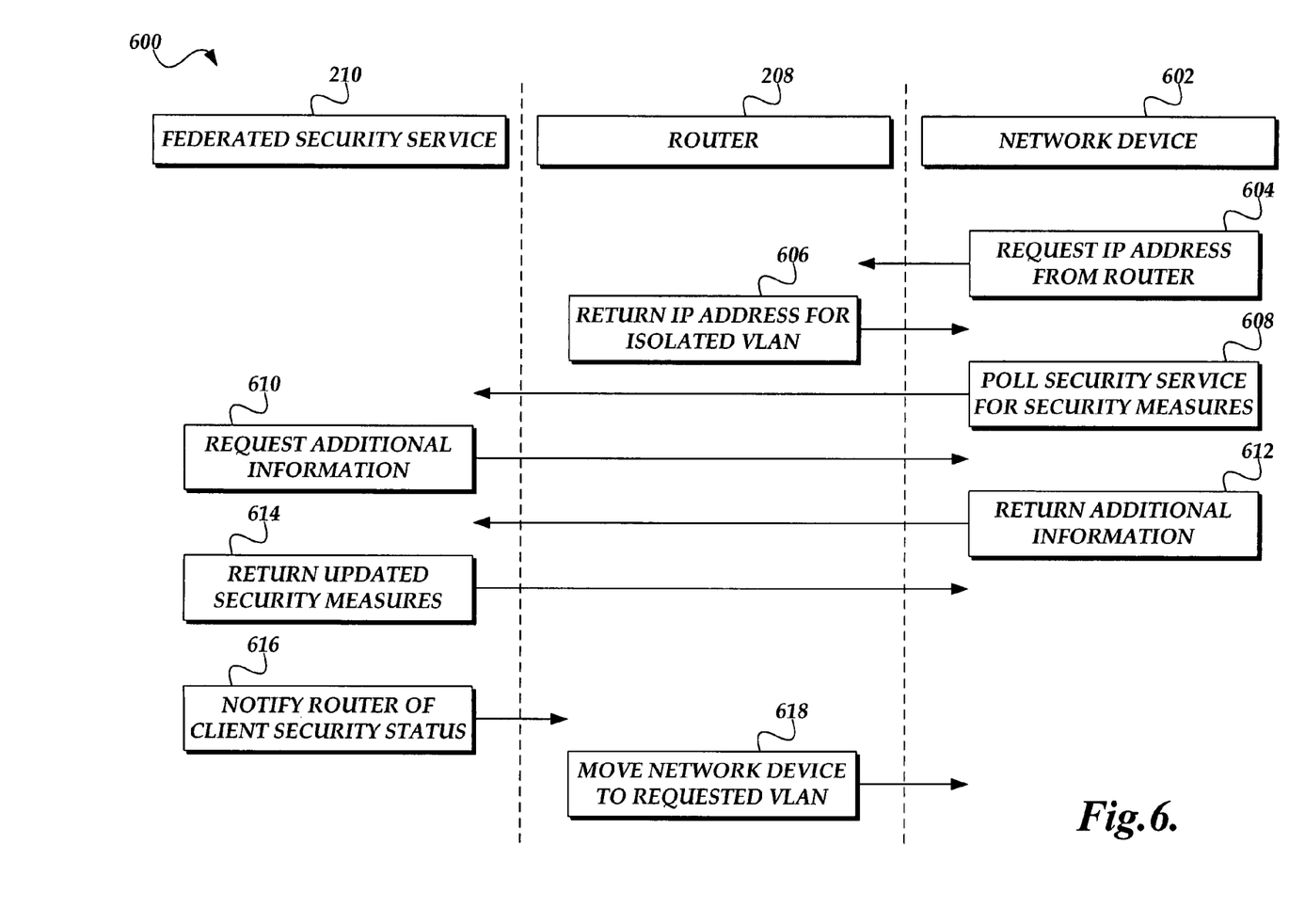
FIG. 6 illustrates an exemplary exchange between a network device and corresponding network security module, a federated security service, and a router in adding the network client to a protected VLAN in a secure manner.

As mentioned above, aspects of the present invention may also be used to connect, or reconnect, a computer to a network in a secure manner, i.e., a manner in which the network is protected from computer exploits that may otherwise be introduced by the "added" computer or other network device. FIG. 6 illustrates an exemplary exchange 600 between a network device and its network security module (collectively referred to as the network device 602 for purposes of FIG. 6), a federated security service 210, and a router 208 in adding the network device to a network in a secure manner. The exemplary exchange 600 begins as the network device 602 is connected to the network.

As indicated by event 604, the network device 602, via its network security module, requests an IP address from the router 208. Those skilled in the art will appreciate that in addition to requesting an IP address, the request also typically includes a request to join a particular VLAN in the network. In response, rather than giving the network device 602 an IP address within the requested VLAN, the router 208 returns an IP address that places the network device in an isolated VLAN, as indicated by event 606. An isolated VLAN is one in which the added network device is the only member, and from which the network device cannot communicate with any other network devices in the network except the router and the federated security service 210.

As described in the above-incorporated reference, when a computer or other device, protected by a network security module is first powered on or connected to a network, or when the corresponding network security module is first powered on or connected to the network, the network security module defaults to blocking all network activities except communications with trusted network locations. These trusted network locations include, but are not limited to, the federated security service 210 or general security service 204, anti-virus update locations, operating system update locations, the router 208, and the like. Thus, the first network activity of the network device 602, as permitted by its network security module, is to poll a security service for current security measures. In the illustrated exchange 600, the network device 602 polls the federated security service 210 for current security measures, as indicated by event 608.

According to aspects of the present invention, the federated security service 210, is configured by an administrator to determine whether the network device 602 can be trusted in other VLANs, particularly the VLAN requested by the device in its IP address request, according to predetermined criteria. Similar enabling blocked network devices to resume network activities as described above in regard to FIGS. 4B and 5, this predetermined criteria may include, but is not limited to, whether a particular software update is installed on the network device, whether the current anti-virus software revision is installed, whether the network device is proven to be computer exploit-free, and the like. In addition, this predetermined criteria may also include whether the network device is connected to the network via a network security module.

In order to test whether the network device satisfies the predetermined criteria, the federated security service 210 responds by requesting additional information from the network device 602, as indicated by event 610. The network device 602, in particular its network security module, returns the additional information, as indicated by event 612. Assuming that this additional information satisfies the predetermined criteria, the federated security service 210 returns updated security measures to the network device 602, as indicated by event 614. These updated security measures may or may not correspond to the relaxed set of security measures described above. In fact, the updated security measures may direct the network security module to continue to block all network activities. In one embodiment, the particular set of security measures delivered to the network device 602 is established according to administrator configurations.

In addition to returning security measures to the network device 602, the federated security service 210 notifies the routine 208 of the trustworthiness of the network device, as indicated by event 616. Assuming that the network device 602 is trustworthy according to the predetermined criteria, the router 208 subsequently removes the network device from the isolated VLAN and places it in the VLAN requested during the IP address request, as indicated by event 618.

The exemplary exchange 600 highlights several beneficial aspects of the present invention. For instance, if a network device were to connect to the network without being protected by a network security module, it would be placed in an isolated VLAN without the ability to communication with other network devices and the network would remain protected from any computer exploits infected the device. The network device would remain in the isolated VLAN until an administrator could manually address adding the network device to other VLANs in the network.

Another beneficial aspect of the present invention is that even though the network device 602 is placed in an isolated VLAN, the network device has an opening to the network through which it may automatically establish a greater level of communication as its trustworthiness is established/determined. More particularly, the network device is first placed in a position where, if the network device is infected with a computer exploit, the network device cannot infect other network devices in the network. However, if it is connected via a network security module, it has the ability to communicate with a federated security service 210 enables it to establish its trustworthiness. As the network device 602 establishes its trustworthiness, the federated security service 210 notifies the router 208, or other network components, to permit the network device to participate in other VLANs within the network.

Figure 7:
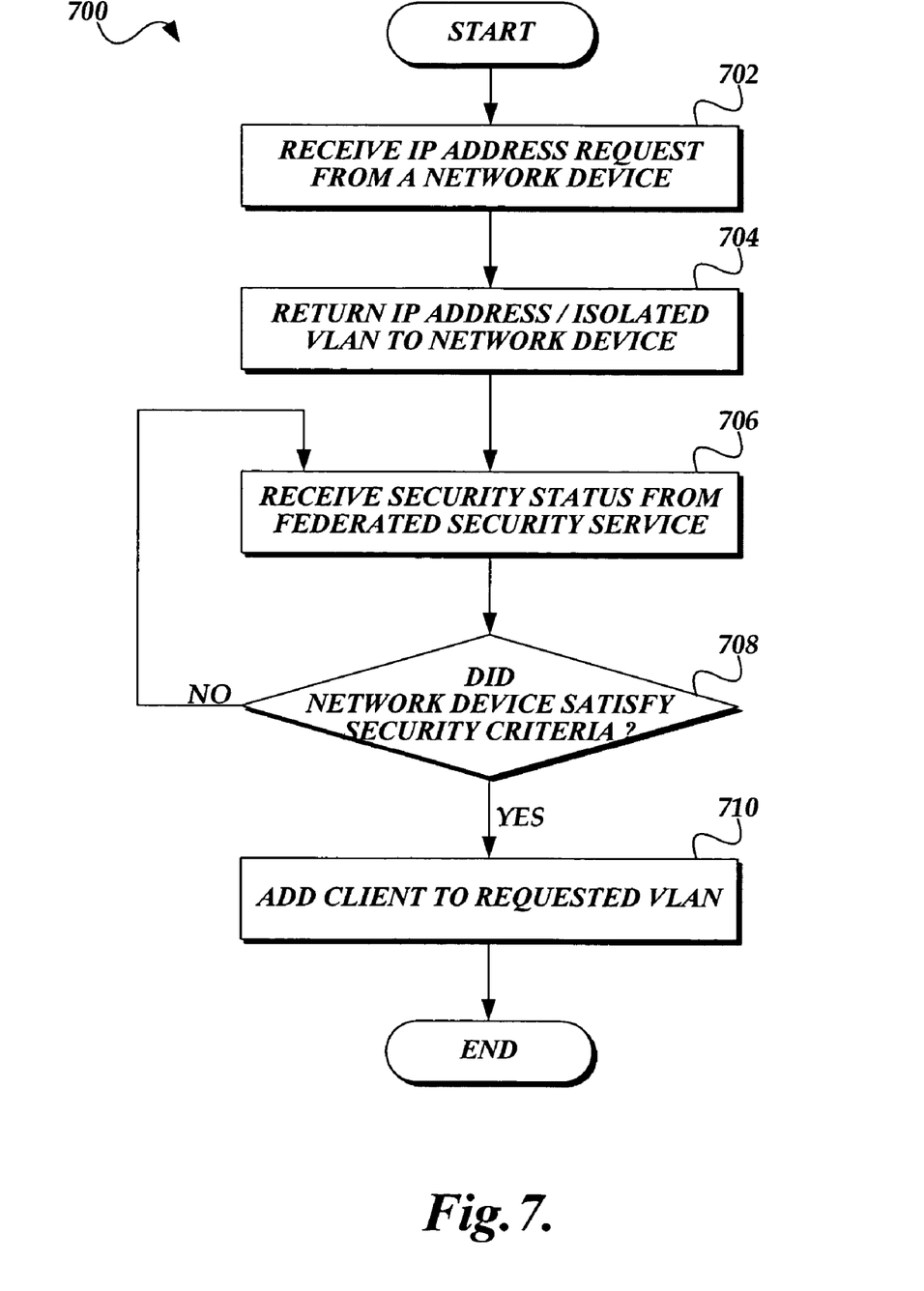
FIG. 7 is a flow diagram illustrating an exemplary routine executed on a network router for adding a network device to a protected VLAN in a secure manner.

FIG. 7 is a flow diagram illustrating an exemplary routine 700, executed on a router 208 or other network component, for adding a network device 602 to a network VLAN in a secure manner. Beginning at block 702, the router 208 receives an IP address request from the network device 602. At block 704, the router 208 returns an IP address to the network device 602 and places the network device in an isolated VLAN. At some point thereafter, at block 706, the router 208 receives security status information from a federated security service 210. As described above, the security status information indicates the trustworthiness of the network device 602, i.e., whether the network device satisfied predetermined criteria for permitting the network device into the requested VLAN.

At decision block 708, the router 208 determines whether the network device 602 satisfied the security criteria for admittance to the requested VLAN. If the network device 602 failed to satisfy the security criteria, the network device is left in the isolated VLAN until, at some later time, at block 706, the router 208 again receives security status information from the federated security service 210. This process continues in this manner until, at decision block 708, it is determined that the network device 602 successfully satisfied the predetermined security criteria for admitting the network device to the requested, protected VLAN. Thereafter, the router 208 adds the network device 602 to the requested VLAN, and the routine 700 terminates.

Similar to that above in regard to FIG. 5, while the exemplary routine 700 is described as including receiving an IP address request from a network security module, in an alternative embodiment, the request may be received/handled outside of the routine, and initiates the remainder of exemplary routine 700. Thus, the exemplary routine 700 should be viewed as illustrative, and not be construed as limiting upon the present invention.

Figure 8:
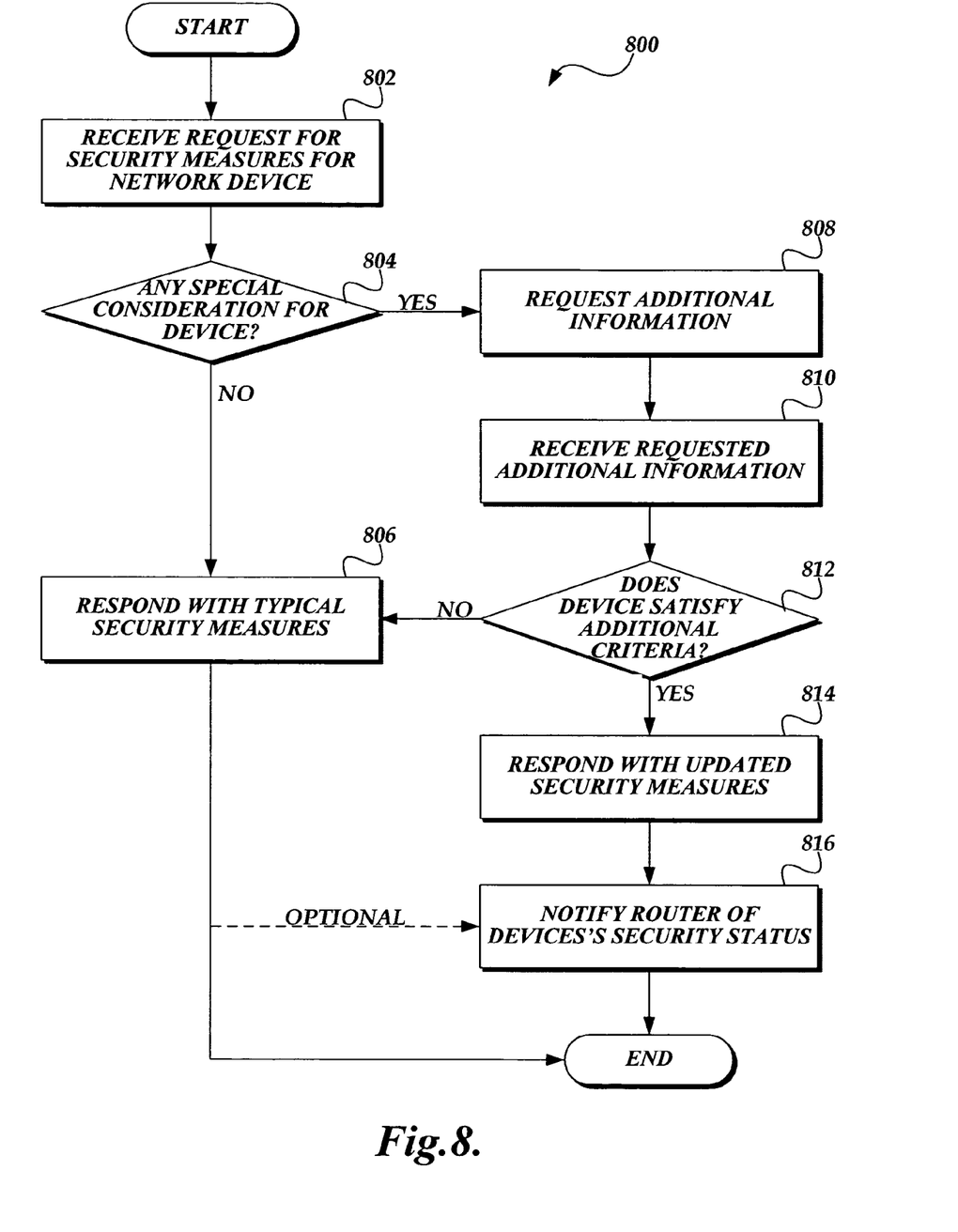
FIG. 8 is a flow diagram illustrating an exemplary routine executed on a federated security service for providing security status information to a network router to assist in adding a network device to a protected VLAN in a secure manner.

FIG. 8 is a flow diagram illustrating an exemplary routine 800, executed on a federated security service 210, for providing security status information to a router 208 to assist in adding the network device to the protected VLAN, as described above in regard to FIG. 7, particularly at block 706. Beginning at block 802, a request is received for current security measures for the network device 602. At decision block 804, a determination is made as to whether the network device 602 is given any special consideration, such as those described above in regard to FIG. 5. If the network device 602 is not identified as one which receives special consideration, at block 806, the federated security service 210 returns the typical, generally applicable security measures to the network device 602, and then terminates. According to alternative aspects, as an alternative to simply terminating, even when the network device 602 is not identified as one which receives special consideration, the federated security service 210 may still notify the router 208 of the network device's security status, illustrated by the optional line to block 816.

If the federated security service 210 is configured to provide special consideration to the network device 602, at block 808, the federated security service requests additional information from the client. This request for additional information is generally similar to the request described above in regard to block 508 of FIG. 5. At block 810, the federated security service 210 receives the requested additional information concerning the network device 602.

At decision block 812, a determination is made as to whether the network device 602 satisfies the predetermined criteria for receiving a relaxed set of security measures. If the predetermined criteria is not satisfied, at block 806 the federated security service 210 responds with typical, generally applicable security measures. However, if the network device 602 satisfies the predetermined criteria, at block 814, the federated security service 210 responds with the relaxed set of security measures. Thereafter, at block 816, the federated security service 210 notifies the router 208 of the network device's 602 security status, and then terminates.

Similar to that above in regard to FIGS. 5 and 7, while the exemplary routine 800 is described as including receiving request for current security measures from a network security module, in an alternative embodiment, the request may be received handled outside of the routine, and initiates the remainder of exemplary routine 800. Accordingly, the above described routine 800 should be viewed as illustrative, and not be construed as limiting upon the present invention.

While various embodiments of the invention have been illustrated and described, including the preferred embodiment, it will be appreciated that various changes can be made therein without departing from the spirit and scope of the invention.

The invention claimed is:

1. A system for enabling a first network device to resume network activities in a secure manner on a communication network when network activities are generally blocked by protective security measures implemented by network security modules, the system comprising:
   a communication network;
   a plurality of network security modules including a first network security module, wherein each of the plurality of network security modules is interposed between the communication network and a network device, the first network security module being interposed between the communication network and the first network device, and wherein each of the plurality of network security modules controls network activities to and from the protected network device by implementing security measures obtained from a security service; and
   a security service that provides security measures to at least the first network security module, the security service being configurable by an administrator such that, when the plurality of network security modules are implementing security measures that block network activities to and from the plurality of network devices, the security service provides a relaxed set of security measures to the first network security module that, when implemented by the first network security module, permits the first network device to resume at least some network activities.

2. The system of claim 1, wherein the security service provides security measures to the first network security module in response to the periodic requests for security measures from the first network security module.

3. The system of claim 2, wherein the security service provides the relaxed set of security measures to the first network security module upon determining whether the network device satisfies a set of predetermined criteria.

4. The system of claim 3, wherein the security service is configurable by an administrator such that the administrator may establish the set of predetermined criteria.

5. The system of claim 4, wherein the security service determines whether the first network device satisfies the set of predetermined criteria by obtaining additional information regarding the first network device.

6. The system of claim 5, wherein obtaining additional information regarding the first network device comprises querying the first network security module whether a software update is installed on the first network device.

7. The system of claim 5, wherein obtaining additional information regarding the first network device comprises querying the first network security module whether the first network device is a member of a particular VLAN.

8. The system of claim 5, wherein obtaining additional information regarding the first network device comprises obtaining information as to whether the first network device is computer exploit free.

9. The system of claim 5, wherein obtaining additional information regarding the first network device comprises querying whether the router administering the VLAN of which the first network device is a member is protected by a network security module.

10. A method, implemented on security service in a communication network, for enabling a first network device to resume network activities in a secure manner on the communication network when network activities on the communication network are generally blocked by protective security measures implemented by network security modules, the method comprising:
    receiving a request for security measures from a network security module interposed between the communication network and the first network device;
    determining whether the security service has been configured to deliver a relaxed set of security measures to the network security module, wherein the relaxed set of security measures, when implemented by the network security module, will enable the first network device to resume network activities in a secure manner on the communication network; and
    returning the relaxed set of security measures to the network security module if it is determined that the security service has been configured to deliver the relaxed set of security measures to the network security module.

11. The method of claim 10 further comprising determining whether the first network device satisfies predetermined criteria, and returning the relaxed set of security measures to the network security module if the network device satisfies the predetermined criteria.

12. The method of claim 11, wherein determining whether the first network device satisfies predetermined criteria comprises obtaining additional information regarding the first network device and determining whether the additional information satisfies the predetermined criteria.

13. The method of claim 12, wherein obtaining additional information regarding the first network device comprises querying the network security module whether a software update is installed on the first network device.

14. The method of claim 12, wherein obtaining additional information regarding the first network device comprises querying the network security module whether the first network device is a member of a particular VLAN.

15. The method of claim 12, wherein obtaining additional information regarding the first network device comprises obtaining information as to whether the first network device is computer exploit free.

16. The method of claim 12, wherein obtaining additional information regarding the first network device comprises querying whether the router administering a VLAN of which the first network device is a member is protected by a network security module.

17. A computer-readable medium bearing computer-executable instructions which, when executed on computing device that provides security measures to a plurality of network security modules interposed between a communication network and network devices, carry out a method for enabling a first network device to resume network activities in a secure manner on the communication network when network activities on the communication network are generally blocked by protective security measures implemented by network security modules, the method comprising:

receiving a request for security measures from a network security module interposed between the communication network and the first network device;

determining whether the computing device has been configured to deliver a relaxed set of security measures to the network security module, wherein the relaxed set of security measures, when implemented by the network security module, will enable the first network device to resume network activities in a secure manner on the communication network; and returning the relaxed set of security measures to the network security module if it is determined that the computing device has been configured to deliver the relaxed set of security measures to the network security module.

18. The method of claim 17 further comprising determining whether the first network device satisfies predetermined criteria, and returning the relaxed set of security measures to the network security module if the network device satisfies the predetermined criteria.

19. The method of claim 18, wherein determining whether the first network device satisfies predetermined criteria comprises obtaining additional information regarding the first network device and determining whether the additional information satisfies the predetermined criteria.

20. The method of claim 19, wherein obtaining additional information regarding the first network device comprises querying the network security module whether a software update is installed on the first network device.

21. The method of claim 19, wherein obtaining additional information regarding the first network device comprises querying the network security module whether the first network device is a member of a particular VLAN.

22. The method of claim 19, wherein obtaining additional information regarding the first network device comprises obtaining information as to whether the first network device is computer exploit free.

23. The method of claim 19, wherein obtaining additional information regarding the first network device comprises querying whether the router administering a VLAN of which the first network device is a member is protected by a network security module.

24. A computer networked system for enabling a first network device to resume network activities in a secure manner on a communication network when network activities are generally blocked by protective security measures implemented by network security modules, the system comprising:

a communication network;

a plurality of network security modules including a first network security module, wherein each of the plurality of network security modules is interposed between the communication network and a network device, the first network security module being interposed between the communication network and the first network device, and wherein each of the plurality of network security modules controls network activities to and from the protected network device by implementing security measures obtained from a security service means; and a security service means that provides security measures to at least the first network security module, the security service means being configurable by an administrator such that, when the plurality of network security modules are implementing security measures that block network activities to and from the plurality of network devices, the security service provides a relaxed set of security measures to the first network security module that, when implemented by the first network security module, permits the first network device to resume at least some network activities.

* * * * *

UNITED STATES PATENT AND TRADEMARK OFFICE
CERTIFICATE OF CORRECTION

PATENT NO. : 7,353,390 B2  
APPLICATION NO. : 10/923349  
DATED : April 1, 2008  
INVENTOR(S) : Adrian M. Chandley et al.

Page 1 of 1

It is certified that error appears in the above-identified patent and that said Letters Patent is hereby corrected as shown below:

Title Pg. Item (54) Title:
delete "NETWORKS'S" and insert -- NETWORK'S --, therefor.

In column 1, line 3, delete "NETWORKS'S" and insert -- NETWORK'S --, therefor.

Signed and Sealed this
Twenty-second Day of February, 2011

David J. Kappos
*Director of the United States Patent and Trademark Office*